UNITED STATES PATENT OFFICE 2,558,049

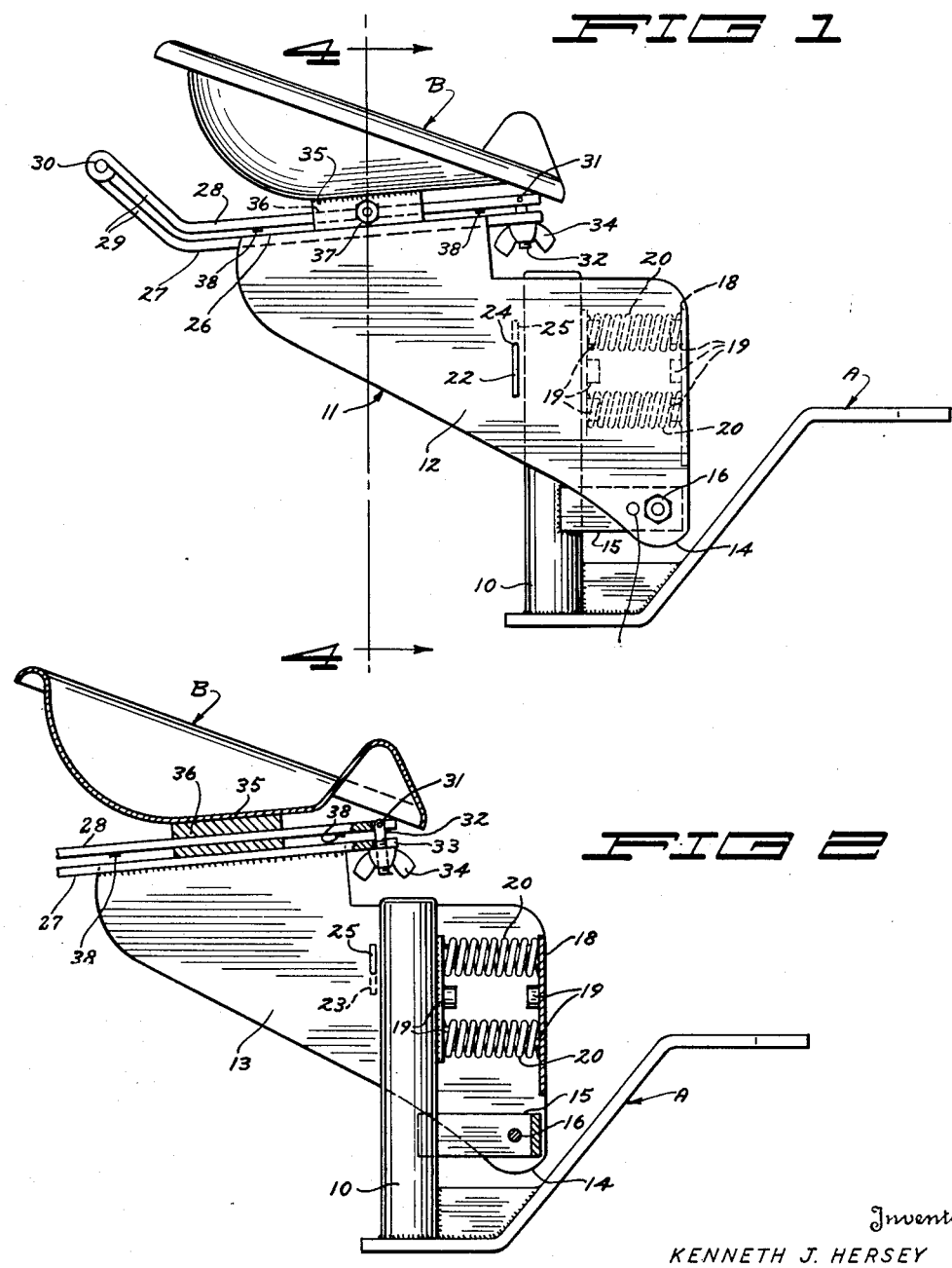

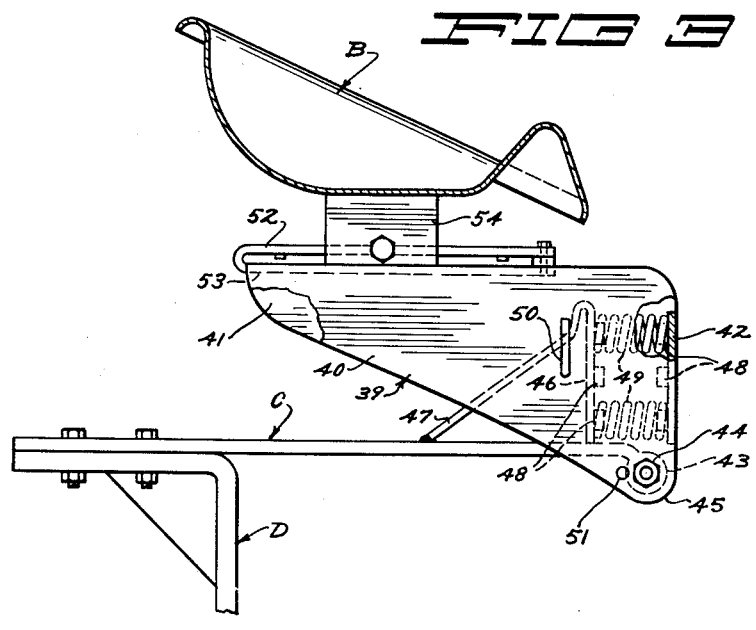
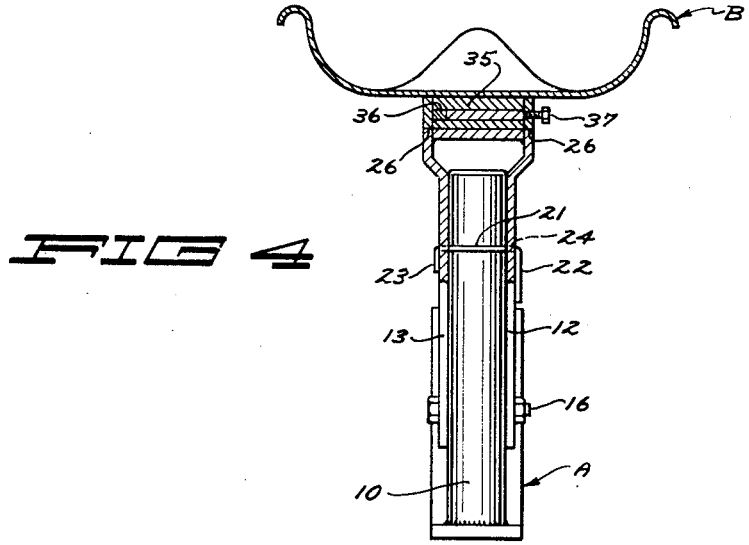

TRACTOR SEAT MOUNT

Kenneth J. Hersey, Hopkins, and Arthur J. Hersey, Minneapolis, Minn.

Application April 12, 1948, Serial No. 20,404

4 Claims. (Cl. 155—51)

This invention relates to improvements in seats for tractors and similar equipment.

The primary object of our invention is to provide a spring loaded shock absorbing seat well adapted to absorb the very considerable shocks and jars incident to the operation of tractors and therefore to make the operation more comfortable and less tiring to the operator.

Another object is to provide a novel spring suspension or loading means for a tractor seat which may be readily adjusted to afford the maximum shock absorption according to the weight of the operator, and which suspension includes springs so arranged as to absorb the vertical movement of the tractor and transmit a minimum vertical component to the seat itself.

Still another object is to provide certain improvements in the way of seat adjustments and provision for turning the seat to hang with its normally upper side protected from the elements when not in use.

These and other more detailed and specific objects will be disclosed in the course of the following specification, reference being had to the accompanying drawings, in which—

Fig. 1 is a side elevation of a tractor seat, and one form of mounting bracket therefor according to our invention.

Fig. 2 is a vertical longitudinal sectional view.

Fig. 3 shows a slightly modified seat suspension.

Fig. 4 is a vertical cross sectional view along the line 4—4 in Fig. 1.

Referring now more particularly and by reference characters to the drawing, A designates in Figs. 1, 2 and 4, an arm adapted for mounting upon one type of tractor and in accordance with our invention a standard or upright bracket 10 is secured in an upright position to and rigidly braced on the rear end of this arm to serve as a mounting for the seat suspension means. Said suspension means comprises a seat support 11 of irregular shape having spaced sides 12 and 13 which slightly clear the opposite sides of the standard 10. The forward lower corners 14 of these sides 12 and 13 fit over and are pivotally attached to a U-shaped pivot bracket 15 which is secured to, or formed on, the standard 10 and extends forwardly near the lower end thereof. For thus mounting the seat support a bolt 16 traverses the corners 14 and the bracket 15 and it will be noted that an extra opening 17 is provided in each said corner 14 giving a choice of two positions for the bolt 16. The purpose of this will be presently made clear.

The seat support 11 has an upright forward end 18 which connects its sides 12 and 13 and stands in spaced relation forwardly of the standard 10, and upon the facing surfaces of the post and this end 18 there are a series of vertically spaced spring rests or seats 19 between any aligned and corresponding two of which may be placed and held a heavy expansion coil spring 20. As here shown two of such springs are used, whereas space, or rests 19, are provided for three. Obviously these springs will tend to swing the seat support upwardly and forwardly at its rear end and such movement is limited, when the seat is unoccupied, by a removable stop pin 21 (Fig. 4) passing through the sides 12 and 13 to the rear of the standard 10 well above the pivot 16. As here shown the pin 21 has a handle end 22 and a shorter locking end 23 and the side 12 has an opening 24 through which the end 23 may be worked, while the other side 13 has a slot 25 through which this end may pass. When released the handle 22 will drop to a vertical position of its own weight turning the end 23 at an angle to the slot 25 and holding the pin in place, so that it will contact the rear of the standard.

The support 11 has a rear upper seat supporting end 26 and here, between the sides 12 and 13 of the support, there is secured the lower arm 27 of a seat mounting member having also an upper arm 28. The rear ends of the arms 27 and 28 angle upwardly at 29 and are hinged together at 30 on a horizontal transverse axis, and at the forward end of the upper arm there is pivoted at 31 a latch screw 32 which normally depends through a forwardly opening notch 33 in the corresponding end of the lower arm. A wing nut 34 is provided on the lower end of the latch screw.

A conventional tractor seat B is provided and is secured to a slide 35 having a slot 36 extending from front to rear to fit over and slidably engage the upper arm 28 of the seat mount. A set screw 37 is tapped through one side of this slide to engage the arm 28 as seen in Fig. 4.

In operation when the seat is occupied the weight of the occupant will tend to depress the rear of the seat support 11, swinging it about its pivot 16 and compressing the spring 20. These springs are selected in strength, and in number, according to the weight of the operator so that they are normally compressed a comparatively short distance and in this connection, it is to be noted further that the position of the springs with respect to the pivot 16 permits a further variation according to load. Since the rests or seats 19 vary in distance from the pivot 16 the springs may be located so as to receive forces of varying leverages as will be apparent. Now as shock forces and vertical vibrations are transmitted through the bracket A and standard 10 from the tractor, they will be absorbed by the springs and inasmuch as these springs are positioned with their axes generally horizontal, and at right angles to the vertical direction of the shock forces it will be observed that such shock forces will be absorbed with a minimum of vertical displacement of the seat. There results a maximum of comfort and minimum of tiring bouncing of the rider on the seat.

The slide 35 may be adjusted forwardly and rearwardly along the arm 28, within limits set by stop pins 38 depending therefrom, for maximum comfort and convenience of the operator and when not in use the seat may be flopped over to the rear on the hinge 30 by loosening and swinging out the latch screw 32 to free the arm 28. This will protect the surface of the seat from falling rain and the direct rays of the hot sun.

In Fig. 3 we show a modified suspension means for the seat B, for a different type of tractor and to illustrate the manner in which the structure may be varied, within our invention, for this purpose. Here the mounting bracket takes the form of a bar C adapted to be secured to a part D of the tractor and extending forwardly therefrom. The seat support 39 has sides 40 and 41 and a closed forward end 42 but it is more compact vertically. To mount the support the bar C has an eye at its forward end at 43 to accommodate a pivot bolt 44 which passes through the forward corners 45 of the support. A standard or bracket 46 is secured to the upper side of the bar C, braced as designated at 47, and is spaced to the rear of the closed end 42 of the support so that a series of vertically spaced spring rests 48 may be provided to mounted springs 49 exactly as previously described. A stop pin 50, like that appearing at 21, also limits the motion of the support when unloaded.

Here again the support has two openings, one of which appears at 51, for the bolt 44. This adjustment in both modifications of our invention here shown permits a substantial variation in the loading on the springs as will be readily apparent, and may be used to compensate for widely varying weights on the seat.

To mount the seat B we have shown in Fig. 3 merely upper and lower bars 52 and 53 both rigid with respect to the support 39 and thus the seat does not have the "flop over" feature. However, the seat is again here mounted on a slide 54 for back and forth adjustments.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A tractor seat support of the character described, comprising in combination, an upright support for fastening rigidly to the tractor, means forming a pivot spaced forwardly from the lower part of said support, a seat supporting member pivoted to said pivot and extending upwardly and rearwardly therefrom, means for mounting a seat on the upper rear portion of the member, and at least one coil spring located above the pivot in a generally horizontal position and engaging forward portions of the support and member to bias the latter in an upward direction at its rear portion, the said member having portions having sliding bearing contact with the sides of the support to prevent lateral displacement of the member.

2. A tractor seat support of the character described, comprising in combination, an upright support for fastening rigidly to the tractor, means forming a pivot spaced forwardly from the lower part of said support, a seat supporting member pivoted to said pivot and extending upwardly and rearwardly therefrom, means for mounting a seat on the upper rear portion of the member, and at least one coil spring located above the pivot in a generally horizontal position and engaging forward portions of the support and member to bias the latter in an upward direction at its rear portion, the said member having upright side portions bearing slidably upon the sides of the support.

3. In a tractor seat mount of the character described, the combination of an upright support for rigid mounting on the tractor, means on the support forming a pivot forward of the lower portion thereof, a seat supporting member having upright side portions positioned along opposite sides of the support and pivoted at lower forward corners on said pivot, said member also having a forward end joining said side portions above the pivot, means on the upper rear part of the member for mounting a seat, and at least one expansion coil spring braced between the forward side of the support and the front end of the member above the pivot.

4. In a tractor seat mount of the character described, the combination of an upright support for rigid mounting on the tractor, means on the support forming a pivot forward of the lower portion thereof, a seat supporting member having upright side portions positioned along opposite sides of the support and pivoted at lower forward corners on said pivot, said member also having a forward end joining said side portions above the pivot, means on the upper rear part of the member for mounting a seat, a series of vertically spaced spring seats on the forward side of the support and a similar series of seats on the rear face of the front end of the member, and at least one expansion coil spring braced between the seats.

KENNETH J. HERSEY.
ARTHUR J. HERSEY.

REFERENCES CITED

The following references are of record in the file of this patent:

UNITED STATES PATENTS

| Number | Name | Date |
| --- | --- | --- |
| 533,300 | Josselyn | Jan. 29, 1895 |
| 982,068 | Ingraham | Jan. 17, 1911 |
| 1,390,865 | Bangle | Sept. 13, 1921 |
| 1,395,974 | Redfield | Nov. 1, 1921 |
| 1,746,938 | Hawkins | Feb. 11, 1930 |
| 2,298,450 | Baker | Oct. 13, 1942 |
| 2,447,283 | Sheldrick | Aug. 17, 1948 |